US012347252B2

(12) United States Patent
Behnke et al.

(10) Patent No.: US 12,347,252 B2
(45) Date of Patent: Jul. 1, 2025

(54) METHOD FOR REMOTELY OPERATING AN AUTOMATIC BUILDING OR ENCLOSURE CLOSURE, RADIO REMOTE CONTROL TRANSMITTER THEREFOR, BUILDING OR ENCLOSURE CLOSURE SYSTEM, AND COMPUTER PROGRAM

(71) Applicant: Hörmann KG Antriebstechnik, Steinhagen (DE)

(72) Inventors: Thomas Behnke, Bünde (DE); Thomas Lokotsch, Beckum (DE)

(73) Assignee: Hörmann KG Antriebstechnik, Steinhagen (DE)

( * ) Notice: Subject to any disclaimer, the term of this patent is extended or adjusted under 35 U.S.C. 154(b) by 85 days.

(21) Appl. No.: 18/451,608

(22) Filed: Aug. 17, 2023

(65) Prior Publication Data

US 2024/0062600 A1 Feb. 22, 2024

(30) Foreign Application Priority Data

Aug. 17, 2022 (DE) ..................... 10 2022 120 733.1

(51) Int. Cl.
*G07C 9/00* (2020.01)

(52) U.S. Cl.
CPC ..... *G07C 9/00309* (2013.01); *G07C 9/00896* (2013.01); *G07C 2009/00793* (2013.01);
(Continued)

(58) Field of Classification Search
CPC ...... G07C 9/00309; G07C 2009/00928; E05Y 2900/106; E05Y 2900/40; G08C 17/02
See application file for complete search history.

(56) References Cited

U.S. PATENT DOCUMENTS

| | | | | |
|---|---|---|---|---|
| 6,384,710 B1 * | 5/2002 | LeMense | ............... | G08C 17/02 455/133 |
| 2007/0008087 A1 * | 1/2007 | Dery | ....................... | B60R 25/10 340/426.13 |
| 2007/0152798 A1 * | 7/2007 | Witkowski | ............ | G08C 17/02 340/5.72 |

OTHER PUBLICATIONS

"Instructions for installation, operation and maintenance—SupraMatic garage door operator"; Hörmann KG Verkaufsgesellschaft; printers mark TR10A364-B RE / Oct. 2020; downloaded from the Internet on Aug. 12, 2022; pp. 1-43.

(Continued)

*Primary Examiner* — Nabil H Syed
(74) *Attorney, Agent, or Firm* — Studebaker Brackett PLLC

(57) ABSTRACT

In order to enable higher operational and manipulation security in the radio remote control of building or enclosure closures by simple means, the invention provides a method for remote control of an automatic building or enclosure closure (12.1, 12.2, 12.3), comprising:

Figure 1:
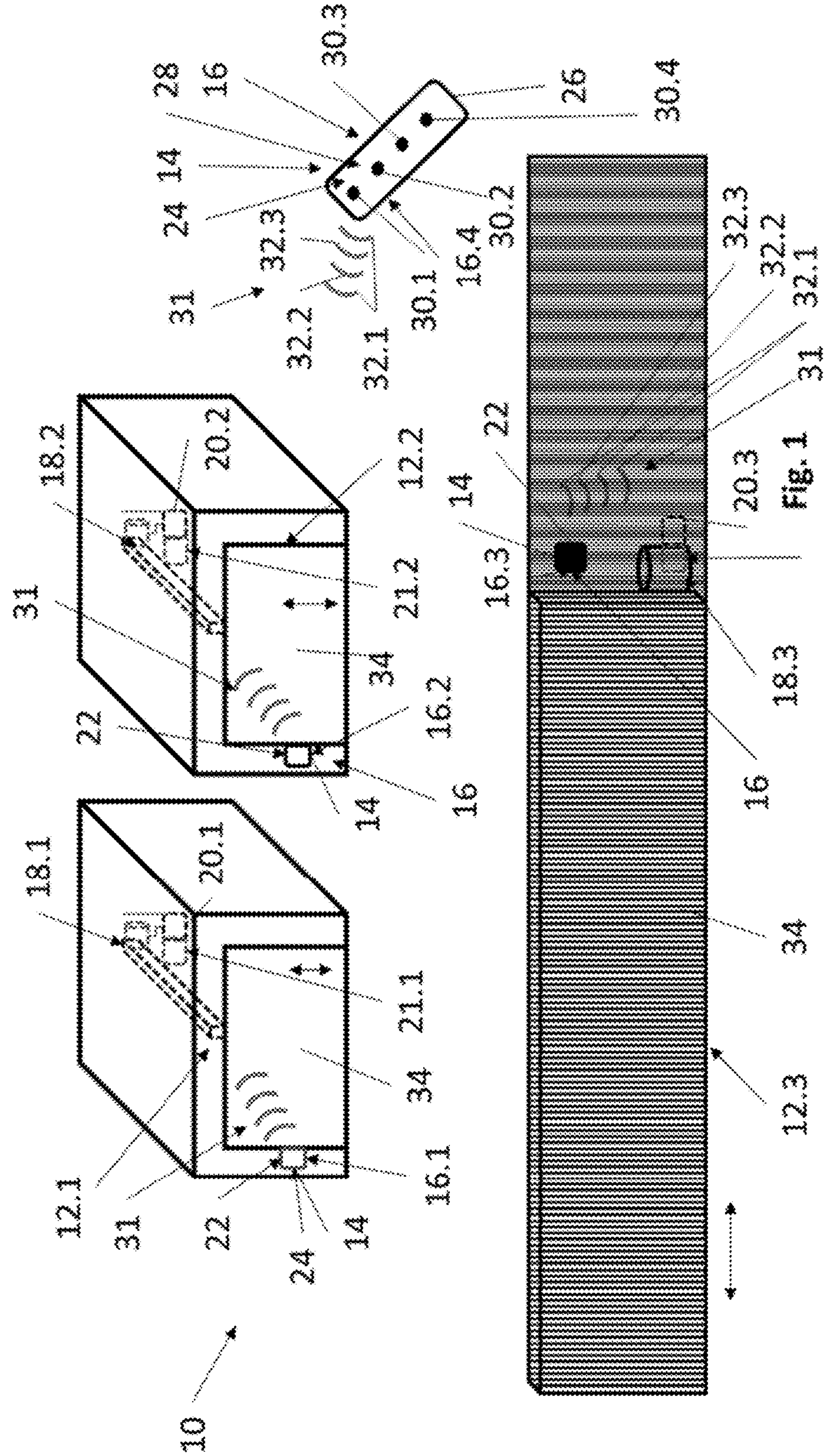

a) transmitting actuation signals (32.1-32.3) with authorization data by means of a transmitter (14) by radio,
b) receiving the actuation signals (32.1, 32.2, 32.3) by a receiver,
c) determining the authorization on the basis of the received data, and
d) controlling the building or enclosure closure (12.1, 12.2, 12.3) to perform the action when authorization is available;

wherein in step a) a first actuation signal (32.1) is repeatedly transmitted alternately on a first frequency using a first modulation and a second actuation signal (32.2) is transmitted on a second frequency using a second modulation, and in step b) radio signals are first received on the first frequency using the first modulation over a time longer than the transmission of the first (Continued)

actuation signal and then radio signals are received on the second frequency using the second modulation over a time longer than the transmission of the second actuation signal.

11 Claims, 3 Drawing Sheets

(52) U.S. Cl.
CPC .............. *G07C 2009/00928* (2013.01); *G07C 2209/08* (2013.01); *G07C 2209/61* (2013.01)

(56) References Cited

OTHER PUBLICATIONS

Instructions for installation, operation and maintenance; control unit garage rolling door operator, Hörmann KG Verkaufsgesellschaft, printers mark TR10A163-D RE / Jun. 2016; downloaded from the Internet on Aug. 12, 2022; pp. 1-28.
Brochure: Gate Operators and Smart Home Systems; garage door operators, swing and sliding door operators; Hörmann homee; Hormann KG Verkaufsgesellschaft; printers mark status Nov. 2021 / Printed Nov. 2021 / HF 85945 EN / PDF; downloaded from the Internet on Aug. 12, 2022; pp. 1-52.
Instructions for installation, operation and maintenance—Sliding door operator; Hörmann KG Verkaufsgesellschaft; printers mark 4510648 B1 / Sep. 2021 / RE; pp. 1-64.
Operating instructions for handheld transmitter HS 1 BiSecur / HS 4 BiSecur, Hörmann KG Verkaufsgesellschaft; printers mark TR20A088-C RE / Feb. 2018; downloaded from the Internet on Aug. 12, 2022; pp. 1-17.
Instructions for installation and operation of radio interior push-button FIT 2 BiSecur, Hörmann KG Verkaufsgesellschaft; printers mark c RE / Aug. 2016; downloaded from the Internet on Aug. 12, 2022; pp. 1-14.
Instructions for installation and operation of radio code push-button FCT 3-1 BiSecur; Hörmann KG Verkaufsgesellschaft; printers mark TR20A260-A RE / Feb. 2020; downloaded from the Internet on Aug. 22, 2022; pp. 1-16.
Instructions for installation and operation of receiver HEI 3 BiSecur; Hörmann KG Verkaufsgesellschaft, printers mark TR20A126-B RE / Oct. 2017; pp. 1-10.

* cited by examiner

METHOD FOR REMOTELY OPERATING AN AUTOMATIC BUILDING OR ENCLOSURE CLOSURE, RADIO REMOTE CONTROL TRANSMITTER THEREFOR, BUILDING OR ENCLOSURE CLOSURE SYSTEM, AND COMPUTER PROGRAM

The invention relates to a method for remotely actuating an automatic building or enclosure closure, comprising:

a) transmitting actuation signals containing data for authorizing and performing an action of the building or enclosure closure by means of a transmitter by radio,
b) receiving the actuation signals by a receiver,
c) determining the authorization based on the received data, and
d) controlling the building or enclosure closure to perform the action when authorization is available. The invention further relates to a radio remote control transmitter adapted for use in such a method, a building or enclosure closure system adapted to perform such a method, and computer programs including control instructions for performing the method.

For the technological background, reference is made to the following literature from which automatic building or enclosure closures, drives therefor, radio remote control transmitters and receivers, and remote control methods are known:

Building or Enclosure Closure Systems, Automatic Building or Enclosure Closures, and Actuators Therefor:

[1] Anleitung für Montage, Betrieb und Wartung—Garagentor-Antrieb SupraMatic, Hörmann K G Verkaufsgesellschaft, Druckvermerk TR10A364-B RE/10.2020, heruntergeladen am 12.08.2022 aus dem Internet (Instructions for installation, operation and maintenance—SupraMatic garage door operator, Hörmann KG Verkaufsgesellschaft, printers mark TR10A364-B RE/10.2020, downloaded from the Internet on Aug. 12, 2022)

[2] Anleitung für Montage, Betrieb und Wartung; Steuerung Garagen-Rolltorantrieb; Hörmann KG Verkaufsgesellschaft, Druckvermerk TR10A163-D RE/06.2016, heruntergeladen am 12.08.2022 aus dem Internet (Instructions for installation, operation and maintenance; control unit garage rolling door operator; Hörmann KG Verkaufsgesellschaft, printers mark TR10A163-D RE/06.2016; downloaded from the Internet on Aug. 12, 2022)

[3] Broschüre: TORANTRIEBE UND SMART HOME SYSTEME; Garagentor-Antriebe, Dreh-und Schiebetor-Antriebe, Hörmann homee; Hörmann KG Verkaufsgesellschaft, Druckvermerk Stand 11.2021/Druck 11.2021/HF 85945 DE/PDF, heruntergeladen am 12.08.2022 aus dem Internet (Brochure: GATE OPERATORS AND SMART HOME SYSTEMS; garage door operators, swing and sliding door operators, Hörmann homee; Hörmann K G Verkaufsgesellschaft, printers mark status 11.2021/ Printed 11.2021/HF 85945 EN/PDF; downloaded from the Internet on Aug. 12, 2022)

[4] Anleitung für Montage, Betrieb und Wartung—Schiebetor-Antrieb; Hörmann KG Verkaufsgesellschaft, Druckvermerk 4510648 B1/09-2021/RE (Instructions for installation, operation and maintenance—Sliding door operator; Hörmann KG Verkaufsgesellschaft, printers mark 4510648 B1/09-2021/RE)

Radio Remote Control Transmitter:

[5] Bedienungsanleitung Handsender HS 1 BiSecur/HS 4 BiSecur, Hörmann KG Verkaufsgesellschaft, Druckvermerk TR20A088-C RE/02.2018, heruntergeladen am 12.08.2022 aus dem Internet (Operating instructions for handheld transmitter HS 1 BiSecur/HS 4 BiSecur, Hörmann KG Verkaufsgesellschaft, printers mark TR20A088-C RE/02.2018; downloaded from the Internet on Aug. 12, 2022)

[6] Anleitung für Montage und Betrieb Funk-Innentaster FIT 2 BiSecur, Hörmann KG Verkaufsgesellschaft, Druckvermerk TR20A112-E RE/08.2016, heruntergeladen am 12.08.2022 aus dem Internet (Instructions for installation and operation of radio interior push-button FIT 2 BiSecur, Hörmann KG Verkaufsgesellschaft, printers mark TR20A112-E RE/08.2016; downloaded from the Internet on Aug. 12, 2022)

[7] Anleitung für Montage und Betrieb Funkcodetaster FCT 3-1 BiSecur; Hörmann KG Verkaufsgesellschaft, Druckvermerk TR20A260-A RE/02.2020, heruntergeladen am 12.08.2022 aus dem Internet (Instructions for installation and operation of radio code push-button FCT 3-1 BiSecur; Hörmann KG Verkaufsgesellschaft, printers mark TR20A260-A RE/02.2020; downloaded from the Internet on Aug. 22, 2022)

Receiver:

[8] Anleitung für Montage und Betrieb Empfänger HEI 3 BiSecur; Hörmann KG Verkaufsgesellschaft, Druckvermerk TR20A126-B RE/10.2017 (Instructions for installation and operation of receiver HEI 3 BiSecur; Hörmann KG Verkaufsgesellschaft, printers mark TR20A126-B RE/10.2017)

Building or enclosure closures within the meaning of the invention are considered to be, in particular, doors, such as garage doors, entrance gates, designed for example as sectional doors, up-and-over doors, overhead doors, rolling doors, sliding doors or the like. Automatic building or enclosure closures are provided with actuator for driving a wing of the building or enclosure closure between an open position and a closed position. It has long been known to remotely control such building or enclosure closures with special radio remote control transmitters. The term radio remote control transmitters refers to radio transmitters of the type shown in references [5] through [7] that are specially designed and manufactured for remote control of door/gate operators and other units or peripherals of building or enclosure closures. These transmit actuation signals when the user presses a button or otherwise individually actuates the device. The actuation signals are coded and/or contain other data from which an authorization of the associated transmitter can be seen and/or which contain information about the action to be controlled with the actuation signal, e.g., a command pulse for an actuator paired with the transmitter. A transmitter may be paired with different actuators, with different keys being associated for example with the actuation signals for the different actuators. Receivers are connected to the actuators, e.g., are part of a control unit (e.g., control board) of the actuator or formed externally. The receiver checks whether an actuation signal from an authorized transmitter has been received and initiates the action associated with the actuation signal.

Such automatic building or enclosure closures have been sold for a long time, so that different generations may also exist in the field. However, it is desired to be able to use a radio remote control transmitter to control the different actuators as well.

In previous methods for the radio remote control of such building or enclosure closures, the actuation signals are transmitted on a single frequency released for this purpose with an amplitude modulation (modulation type OOK). The previous solution is thus based on one frequency band. Three identical signal frames are transmitted on the same frequency band. This band is heavily occupied. Furthermore, the OOK modulation type is susceptible to interference. This can result in the operator having to actuate the radio remote control transmitter several times until the desired action is actually performed.

The invention is based on the object of improving the remote operation of building or enclosure closures in terms of convenience, security against unauthorized operation and operational reliability.

To achieve this object, the invention provides a method according to claim 1. A radio remote control transmitter designed for use as a transmitter in such a method, a system for carrying out the method, and computer programs for units of the system with control instructions for carrying out the method are the subject of the further independent claims.

Advantageous embodiments are the subject of the subclaims.

The invention provides a method for remotely actuating an automatic building or enclosure closure, comprising:

a) transmitting actuation signals containing data for authorizing and performing an action of the building or enclosure closure by means of a transmitter by radio b) receiving the actuation signals by a receiver, c) determining the authorization based on the received data, and d) controlling the building or enclosure closure to perform the action when authorization is available;

wherein step a) comprises to repeatedly alternately perform the steps of:

a1) transmitting a first actuation signal on a first frequency using a first modulation within a first transmission time interval; and a2) transmitting a second actuation signal on a second frequency using a second modulation within a second transmission time interval, and wherein step b) comprises to repeatedly alternately perform the following steps:

b1) receiving radio signals by the receiver on the first frequency using the first modulation within a first receive time interval that is longer than the first transmit time interval, and b2) receiving radio signals by the receiver on the second frequency with the second modulation within a second receive time interval that is longer than the second transmit time interval.

In particular, the first and second frequencies are on two different frequency bands, each of which is permitted as an alternative frequency band for such remote control signals. These may be different in different countries. For example, different frequency bands are approved for radio remote controls in the USA than in Germany or the EU.

It is preferred that step a) comprises the repeated alternate execution of steps a1) a2) and a3) transmitting a third actuation signal on a third frequency using one of the second modulations within a third transmit time interval, and that step b) comprises repeatedly alternately performing steps b1), b2) and b3) receiving radio signals by the receiver on the third frequency using the second modulation within a third receive time interval that is longer than the third transmit time interval.

The third frequency is also significantly different from the first and second frequencies and is preferably on a third frequency band approved for radio remote controls.

It is preferred that step a2) comprises transmitting at higher transmission power than in step a1).

It is preferred that the modulation type OOK or AM is selected as the first modulation and the modulation type FSK is selected as the second modulation.

It is preferred that the data content of the first actuation signal and the data content of the second actuation signal are different. It is preferred that the receiver determines an authorization when the data content of the first actuation signal and the data content of the second actuation signal indicate an authorization.

It is preferred that the data content of the first actuation signal and the second actuation signal are linked by a predetermined algorithm such that the data of one of these actuation signals has been generated by applying the algorithm to data of the other actuation signal used as original data, wherein the receiver receives the original data by receiving the other actuation signal, and by inversely applying the algorithm to the data of the one actuation signal.

According to a further aspect, the invention provides a radio remote control transmitter for use as a transmitter in the method according to any one of the preceding embodiments, comprising a transmitter unit and a transmitter control unit, wherein the transmitter is adapted, in response to a single actuation input for selecting the action by a user, to repeatedly alternately perform the steps of:

a1) transmitting the first actuation signal on the first frequency using the first modulation within the first transmit time interval, and a2) transmitting the second actuation signal on the second frequency using the second modulation within a second transmit time interval.

It is preferred that the transmitter is adapted, based on the actuation input, to repeatedly perform a sequence of steps a1), a2) and a3) transmitting a third actuation signal on a third frequency using one of the second modulations within a third transmit time interval.

Preferably, in the aforementioned embodiments of the method and the systems and components configured to perform the same, step a1) comprises transmitting the first actuation signal multiple times, e.g., three times, within the first transmit time interval on the first frequency (using the first modulation type).

Preferably, in the aforementioned embodiments of the method and the systems and components configured to perform the same, step a2) comprises a multiple, e.g., triple, transmission of the second actuation signal within the second transmit time interval on the second frequency (with the second modulation type).

Preferably, in the aforementioned embodiments of the method and the systems and components configured to perform the same, step a3) comprises a multiple, e.g., triple, transmission of the third actuation signal within the third transmit time interval on the third frequency (with the second or a third modulation type).

It is preferred that the transmitter is adapted to transmit on the second frequency with a higher transmission power than on the first frequency.

It is preferred that the data content of the first and the second actuation signal are different or that the data content of the first and the second actuation signals are linked by a predetermined algorithm such that the data of one of these actuation signals is generated by applying the algorithm to data of the other actuation signal used as original data.

According to another aspect, the invention provides an automatic building or enclosure closure system comprising a transmitter and an automatic building or enclosure closure provided with a wing movable between an open position for opening an opening in a building or enclosure and a closed position for closing the opening, an actuator for driving the movement of the wing, a receiver, and a controller, wherein the transmitter, the receiver and the controller are arranged to perform the method according to any one of claims 1 to 6.

According to a further aspect, the invention provides a computer program comprising control instructions for causing a transmitter of the building or enclosure closure system or a radio remote control transmitter according to any one of the preceding embodiments to perform the steps of the method according to any one of the preceding embodiments to be performed by the transmitter.

According to another aspect, the invention provides a computer program comprising control instructions for causing a receiver of the system to perform the steps of the method to be performed by the receiver according to any of the preceding embodiments.

Preferred embodiments of the invention relate to a remote control method for garage doors or driveway gates or similar closures using frequency hopping with fixed code to increase range, preferably additionally with security algorithm.

The garage is entered several times a day and is often much more than just a large storage room. Besides the car, expensive bicycles, garden tools and much more are stored in it. The invention increases comfort and operational safety. Furthermore, it protects this area by providing a more secure radio.

Preferred embodiments of the invention have the advantage of providing convenience through a greater radio range, as well as ensuring security of the radio signal.

The previous solution relies on one frequency band. Three equal signal frames are transmitted on the same frequency band. This band is heavily occupied.

Furthermore, the OOK modulation type is susceptible to interference. This may result in relatively low operational reliability.

Advantages of embodiments of the invention are:

higher transmission power which thus enables a greater range;

if a frequency band is occupied or disturbed, the radio signal still arrives, the actuator moves when the transmitter is actuated;

there are different signals in the air, reducing the risk of tampering;

modulation is less susceptible to interference.

Preferably, to ensure backward compatibility, the original frequency and modulation type are retained. The frequency band as well as modulation type are changed on it. Due to the higher permissible transmission power, a greater range is achieved. Furthermore, the operational safety is also increased since an occupied frequency band is/can be bypassed. To increase the protection against tampering, the data content of the radio signal is changed by an algorithm with each frequency band change in the transmitter. The receiver decodes and compares the signals according to the received frequency and executes them if correct. There is no additional hardware cost.

Figure 2:
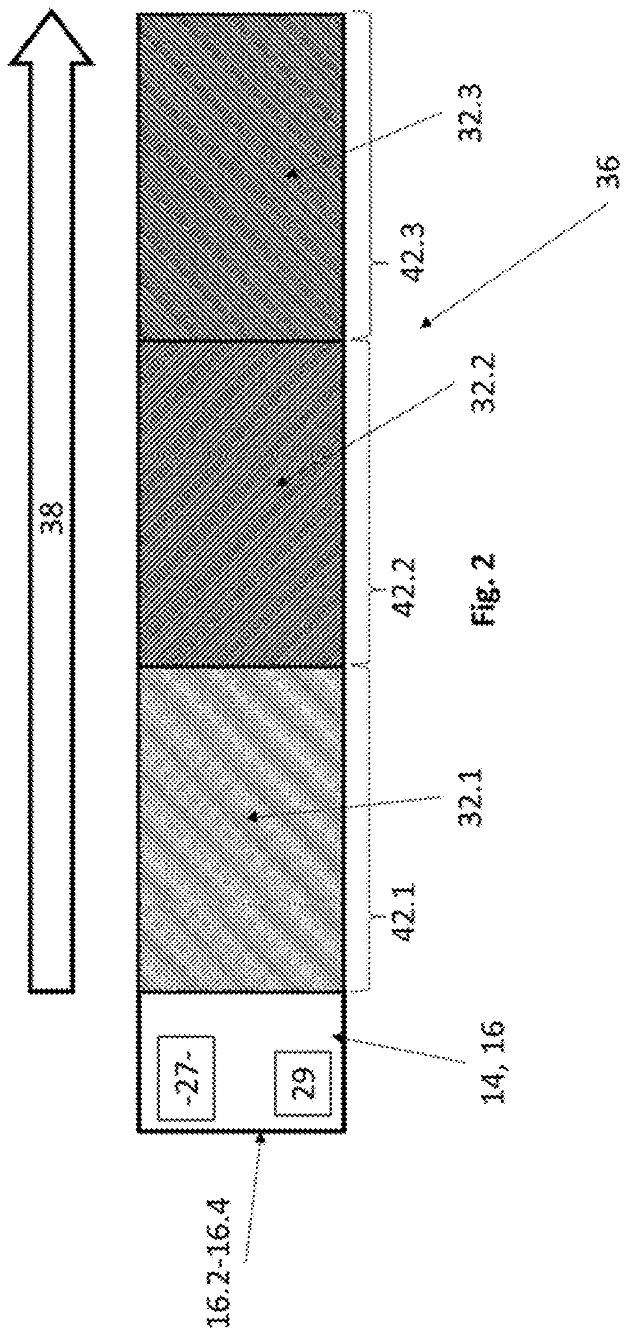
Figure 3:
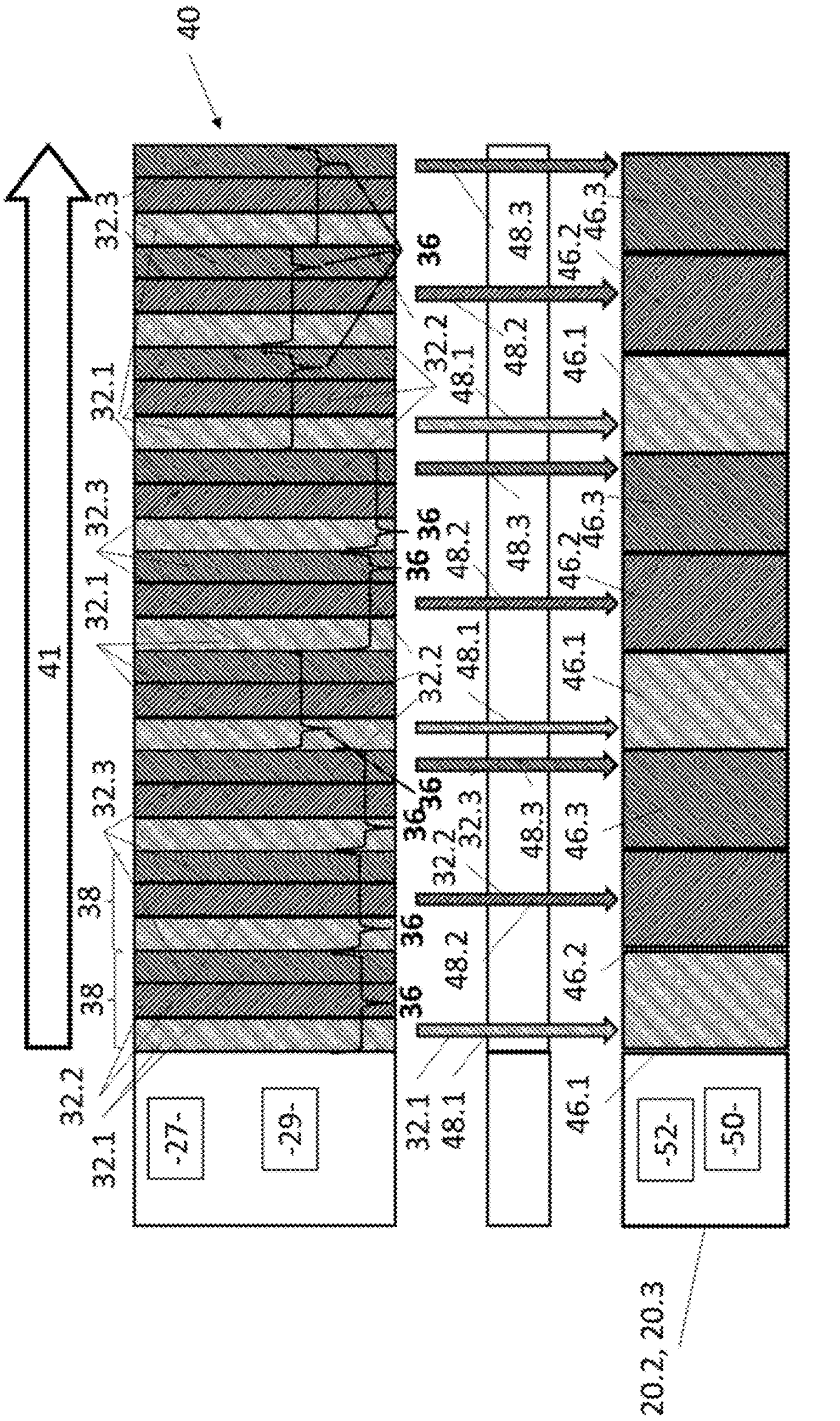

One embodiment is described in more detail below with reference to the accompanying drawings wherein it is shown by:

FIG. 1 a schematic overall view of a building or enclosure closure system;

FIG. 2 a graph showing a timing of a transmit pulse of a transmitter of the system of FIG. 1; and FIG. 3 a graph showing a timing of a telegram executed upon actuation by the operator to control a desired action, with scanning by a receiver of the building or enclosure closure system.

FIG. 1 schematically illustrates a building or enclosure closure system 10 comprising one or more automatic building or enclosure closures 12.1, 12.2, 12.3 and at least one transmitter 14 in the form of a radio remote control transmitter 16. In the exemplary embodiment shown, the building or enclosure closure system 10 comprises first to third automatic building or enclosure closures 12.1, 12.2, 12.3, which are, for example, in the form of automatic doors/gates. The first building or enclosure closure 12.1 is designed, for example, as a first automatic garage door, the second building or enclosure closure 12.2 is designed, for example, as a second automatic garage door, and the third building or enclosure closure is designed, for example, as an automatic yard or driveway gate.

The automatic building or enclosure closures 12.1, 12.2, 12.3 each have an actuator 18.1, 18.2, 18.3, a receiver 20.1, 20.2, 20.3, and a controller 21.1, 21.2, 21.3. The actuator 18.1, 18.2, 18.3 is controllable by the controller 21.1, 21.2, 21.3 in accordance with remote control signals 31 received via the receiver 20.1, 20.2, 20.3.

In the illustrated example, a first to fourth radio remote control transmitter 16.1-16.4 are provided as transmitters 14. In the illustrated embodiment, the first to third radio remote control transmitters 16.1, 16.2, 16.3 are mounted in a stationary manner in the vicinity of a respective one of the first to third building or enclosure closures 12.1, 12.2, 12.3 and are designed, for example, as interior pushbuttons with a button as operator interface or as exterior pushbuttons with a person identification device 22 in the region of an operator interface 24. For example, the external pushbuttons are designed as key pushbuttons with a lock cylinder, as code pushbuttons with a keypad for entering a numerical code, as transponder pushbuttons with a reading device for reading an ID tag (e.g., RFID tag) or as fingerprint pushbuttons with a device for reading a fingerprint.

In particular, the radio remote control transmitter 16 is a mobile transmitter 26, such as a transmitter provided in a vehicle, for example a built-in transmitter, or a hand-held transmitter, as shown in FIG. 1 as the fourth radio remote control transmitter 16.4. The mobile transmitter 26 includes a selection device 28 at the user interface 24 that allows the user to transmit one of a plurality of remote control signals 31, for example by pressing one of a plurality of buttons 30.1-30.4. For example, a first button 30.1 is associated with the first building or enclosure closure 12.1, and in response to pressing this first button 30.1, the radio remote control transmitter 16 transmits a first remote control signal 31.1 for remotely controlling the first building or enclosure closure 12.1. The other buttons 30.2, 30.3, 30.4 may be associated correspondingly with the other building or enclosure closures 12.2, 12.3 or other peripheral devices not shown, such as a lighting system.

Concerning the hardware architecture, the radio remote control transmitters 16, 16.1-16.4 can basically be constructed as shown in prior art mentioned at the beginning, and reference is made in this respect to the literature listed under items [5] to [7] for further details. In particular, the radio remote control transmitters 16, 16.1-16.4 have a control unit 27 and a transmitter unit 29, as indicated in FIG. 2.

The control unit 27 is designed, in particular, as a computing unit into which a computer program with corresponding control instructions for carrying out the steps of the method described in more detail below, which are executed on the transmitter 14, is loaded or can be loaded.

The transmitter unit 29 is designed to transmit radio signals on a first to third different frequency band with a first to third frequency.

The remote control signals 31 comprise a sequence of actuation signals 32.1, 32.2, 32.3. The actuation signals 32.1, 32.2, 32.3 may also be conventionally constructed in terms of information content. Usually, an actuation signal 32.1, 32.2, 32.3 has an (authorization) code. When pairing receiver 20.1-20.3 and transmitter 14, codes are taught-in so that receiver 20.1, 20.2, 20.3 recognizes an authorized transmitter 14 when a taught-in code is received. In pulsed operation, when the remote control signal 31, 31.1 is received from an authorized transmitter 14, a movement of the associated actuator 18.1-18.3 is initiated, and the actuator 18.1-18.3 moves the associated wing 34 of the corresponding building or enclosure closure 12.1-12.3 to the opposite end position. If the assigned remote control signal 31 is received again during the movement, the movement is stopped. If it is received again, the actuator 18.1-18.3 is reversed.

It is also possible that one of the receivers 20.1-20.3, e.g. the first receiver 20.1, is a conventional receiver operating exclusively with OOK modulation on a first frequency which has already been approved for such radio remote controls for some time for the geographical area in which the building or enclosure closure system 10 is used. Such a receiver, for example, an older one acquired and installed earlier, scans the first frequency alone for first actuation signals 32.1 modulated with OOK. Accordingly, a radio remote control transmitter paired exclusively with a conventionally operating receiver, for example the first radio remote control transmitter 16.1, may transmit as a first remote control signal 31.1 controlling the first actuator 18.1 a sequence of, for example, three successively transmitted first actuation signals 32.1, which transmits the code paired with the first receiver or possibly further data, such as a header, in OOK modulation on the first frequency.

At least one of the further radio remote control transmitters 16.2-16.4 emits as remote control signal 31 a sequence of several different actuation signals 32.1, 32.2, 32.3, as this is shown in FIGS. 2 and 3. FIG. 2 schematically shows the radio remote control transmitter 16, 16.2-16.4 according to one embodiment of the invention and a transmit pulse 36 of the remote control signal 31 transmitted over a transmit pulse time 38. The transmit pulse 36 has a first actuation signal 32.1, a second actuation signal 32.2, and a third actuation signal 32.3 transmitted in sequence.

The first actuation signal 32.1 has the code indicating the authorization of the transmitting radio remote control transmitter 16.2-16.4 and possible other data transmitted in OOK modulation on the first frequency with a first transmission power.

The data of the second actuation signal 32.2 has been generated by a predetermined algorithm from the data of the first actuation signal 32.2. Any algorithm from whose result the original data can be unambiguously obtained again by applying a corresponding inverse algorithm can be used as an algorithm. Algorithms of usual encryption methods can thus be applied. Accordingly, the data of the third actuation signal 32.3 is also generated by an algorithm from the data of the second actuation signal 32.2, so that the first to third actuation signals contain different data.

The data of the second actuation signal 32.2 is modulated by a modulation type different from the modulation type of the first actuation signal 32.1, for example, frequency modulation FSK, and is transmitted over a second frequency significantly different from the first frequency and on a different frequency band. In the exemplary embodiment shown, the second actuation signal 32.2 is transmitted on the second frequency with FSK modulation and preferably with a higher transmission power.

The data of the third actuation signal 32.3 is also modulated by a modulation type different from the modulation type of the first actuation signal 32.1, for example frequency modulation FSK, and is transmitted over a third frequency which is significantly different from the first and second frequencies and is on a different frequency band. In the illustrated embodiment, the third actuation signal 32.3 is transmitted on the third frequency with FSK modulation and preferably also with a higher transmission power than the first actuation signal 32.1.

The first actuation signal 32.1 is transmitted within a first transmit time interval 42.1, which corresponds at least to the time required to transmit the first actuation signal 32.1. Preferably, a sequence of multiple first actuation signals 32.1 is transmitted within the first transmit time interval 42.1. For example, the first actuation signal is transmitted three times in succession in the first transmission time interval. The second actuation signal 32.2 is transmitted within a second transmit time interval 42.2, which corresponds at least to the time required to transmit the second actuation signal 32.2. Preferably, a sequence of multiple second actuation signals 32.2 is transmitted within the second transmit time interval 42.2. For example, the second actuation signal is transmitted three times in succession in the second transmit time interval 42.2. The third actuation signal 32.3 is transmitted within a third transmit time interval 42.3 corresponding to at least the time required to transmit the third actuation signal 32.3. Preferably, a sequence of multiple third actuation signals 32.3 is transmitted within the third transmit time interval 42.3. For example, the third actuation signal is transmitted three times in succession in the third transmit time interval 42.3. Preferably, the first to third transmit time intervals are of equal length and are dimensioned such that the time is safely sufficient to transmit each corresponding actuation signal 32.1, 32.2, 32.3 three times and there is still a time buffer.

As can be seen from FIG. 3, such a transmit pulse 36, which is formed by a sequence of first to third transmit time intervals 42.1-42.3 and thus by a sequence of a plurality of first, a plurality of second and a plurality of third actuation signals 32.1-32.3 on the first to third frequencies with different modulation types, is transmitted several times in succession, here for example three times in succession. A transmission cycle 40 is thus formed from a sequence of transmission pulses 36, which in turn are formed from an alternating sequence of groups of different actuation signals 32.1-32.3, which are transmitted on different frequencies with different modulation types and preferably with different transmission powers at predetermined transmission time intervals, but all contain as minimum information authorization information in the form of the code stored in the controller 21.1-21.3 as authorized or the code modified by the algorithm.

FIG. 3 shows the transmit cycle 40 over the transmit cycle time 41 (=telegram length) together with a receiver 20.2, 20.3 and its scanning sequences (receive cluster).

At least one or more or even all of the receivers 20.2, 20.3 of the building or enclosure closure system 10 are configured to perform a sequence of different sampling modes:

In a first receive time interval 44.1, which is longer than the first transmit time interval 42.1, the receivers 20.2, 20.3 receive radio signals modulated with the first modulation mode, here OOK, on the first frequency.

In a second receive time interval 44.2, which is longer than the second transmit time interval 42.2, the receiver 20.2, 20.3 receives radio signals modulated with the second modulation type, here FSK, on the second frequency. Received signals are decoded using the inverse algorithm.

In a third receive time interval 44.3, which is longer than the third transmit time interval 42.3, the receiver 20.2, 20.3 receives signals modulated with the second modulation type, here FSK, on the third frequency. Received signals are decoded using the corresponding inverse algorithm.

The receive time intervals 44.1, 44.2, 44.3 are preferably of equal length. Preferably, each receive time interval 44.1, 44.2, 44.3 is at least as long and particularly preferably equal in length as the sum of the first through third transmit time intervals 42.1-42.3.

As shown in FIG. 3, the receiver 20.2, 20.3 performs an alternating sequence of the first through third receive time intervals 44.1-44.3 with the first through third sampling modes 46.1-46.3.

As can be seen from a sampling matching shown by the middle bar and arrows 48.1, 48.2, 48.3 in FIG. 3, the transmission of at least one actuation signal 32.1-32.3 and the execution of a sampling mode 46.1-46.3 sensitive to this actuation signal 32.1-32.3 thus coincide in time for each transmission pulse 36, so that even in the event of interference on one of the frequency bands, several of the actuation signals 32.1-32.3 are received by the receiver.

The received signals are checked to determine whether a valid actuation signal 32.1, 32.2, 32.3 is available by comparing the received codes with the codes stored as authorized.

Depending on the safety requirements, it can now be determined in the control system whether the receipt of one, two or more valid actuation signals is sufficient to determine that a valid remote control signal, in particular command pulse, has been received. It may also be determined that at least two valid different actuation signals (e.g., at least one valid first actuation signal 32.1 and at least one valid second actuation signal 32.2 or one valid second and one valid third actuation signal 32.2, 32.3) must be received to determine that a valid remote control signal 31—e.g., command pulse—has been received.

Thereafter, the operation associated with the corresponding command pulse is initiated.

Accordingly, in the intended operation of the building or enclosure closure system 10, a method for remotely actuating an automatic building or enclosure closure 12.1, 12.2, 12.3 is performed, comprising the steps of:

a) transmitting actuation signals 32.1, 32.2, 32.3 containing data for authorizing and performing an action of the building or enclosure closure by means of a transmitter by radio, b) receiving the actuation signals 32.1, 32.2, 32.3 by means of a receiver 20.1, 20.2, 20.3, c) determining the authorization on the basis of the received data, and d) controlling the building or enclosure closure 12.1, 12.2, 12.3 to perform the action when authorization is available;

wherein step a) comprises repeatedly alternately performing the steps of:

a1) transmitting a first actuation signal 32.1 on a first frequency using a first modulation within a first transmit time interval 42.1; and a2) transmitting a second actuation signal 32.2 on a second frequency using a second modulation within a second transmit time interval 42.2, and wherein step b) comprises repeatedly alternately performing the following steps:

b1) receiving radio signals by the receiver 20.1, 20.2, 20.3 on the first frequency using the first modulation within a first receive time interval 44.1 that is longer than the first transmit time interval 42.1, and b2) receiving radio signals by the receiver on the second frequency with the second modulation within a second receive time interval 44.2 that is longer than the second transmit time interval 42.2.

The receivers 20.1-20.3 are equipped with a receiving device 50 and a receiver control unit 52. The receiver control unit 52 is designed as a programmable unit with a correspondingly loaded computer program containing control instructions for performing the steps of the above-mentioned method to be performed by the receiver. The receiver unit 50 is designed to receive radio signals on the first to third frequency bands.

For further details on possible embodiments of the building or enclosure closure system 10 as well as the building or enclosure closures 12.1-12.3 and their actuators 18.1-18.3 and controls 21.1-21.3, reference is made to the literature [1] to [4].

In order to enable a higher level of operational and manipulation security in the radio remote control of building or enclosure closures by simple means, the invention provides a method for remote control of an automatic building or enclosure closure (12.1, 12.2, 12.3), comprising:

a) transmitting actuation signals (32.1-32.3) with authorization data by means of a transmitter (14) by radio, b) receiving the actuation signals (32.1, 32.2, 32.3) by a receiver, c) determining the authorization on the basis of the received data, and d) controlling the building or enclosure closure (12.1, 12.2, 12.3) to perform the action when authorization is available, wherein in step a) a first actuation signal (32.1) is repeatedly transmitted alternately on a first frequency using a first modulation and a second actuation signal (32.2) is transmitted on a second frequency using a second modulation, and in step b) radio signals are first received on the first frequency using the first modulation over a longer time than the transmission of the first actuation signal and then radio signals are received on the second frequency using the second modulation over a time longer than the transmission of the second actuation signal.

LIST OF REFERENCE SIGNS

10 building or enclosure closure system
12.1 first automatic building or enclosure closure
12.2 first automatic building or enclosure closure
12.3 first automatic building or enclosure closure
14 transmitter

16 radio remote control transmitter
16.1 first radio remote control transmitter
16.2 second radio remote control transmitter
16.3 third radio remote control transmitter
16.4 fourth radio remote control transmitter
18.1 first actuator
18.2 second actuator
18.3 third actuator
20.1 first receiver
20.2 second receiver
20.3 third receiver
21.1 first controller
21.2 second controller
21.3 third controller
22 personal identification device
24 operator interface
26 mobile transmitter
27 transmitter control unit
28 selection device
29 transmitter unit
30 button
30.1 first button
30.2 second button
30.3 third button
30.4 fourth button
31 remote control signal
32 actuation signal
32.1 first actuation signal
32.2 second actuation signal
32.3 third actuation signal
34 wing
36 transmit pulse
38 transmit pulse time
40 transmit cycle
41 transmit cycle time
42.1 first transmit time interval
42.2 second transmit time interval
42.3 third transmit time interval
44.1 first receive time interval
44.2 second receive time interval
44.3 third receive time interval
46.1 first sampling mode (receive cluster for first frequency in first modulation mode, e.g., OOK)
46.2 second sampling mode (receive cluster for second frequency in second modulation type, e.g., FSK)
46.3 third sampling mode (receive cluster for third frequency in second modulation type, e.g. FSK)
48.1 sampling match: first actuation signal—first sampling mode
48.2 sampling match: second actuation signal—second sampling mode
48.3 sampling match: third actuation signal—third sampling mode
50 receiving unit
52 receiver control unit

The invention claimed is:

1. A method for remotely actuating an automatic building or enclosure closure, comprising:
a) transmitting actuation signals containing data for authorizing and performing an action of the building or enclosure closure by radio by means of a transmitter,
b) receiving the actuation signals by a receiver,
c) determining the authorization on the basis of the received data, and
d) controlling the building or enclosure closure to perform the action when authorization is available;
wherein step a) comprises repeatedly alternately performing the steps of:
a1) transmitting a first actuation signal on a first frequency within a first transmit time interval; and
a2) transmitting a second actuation signal on a second frequency within a second transmit time interval,
and wherein step b) comprises repeatedly alternately performing the steps of:
b1) receiving radio signals by the receiver on the first frequency using over a first receive time interval that is longer than the first transmit time interval, and
b2) receiving radio signals by the receiver on the second frequency over a second receive time interval that is longer than the second transmit time interval.

2. The method according to claim 1, wherein
step a) comprises repeatedly alternately performing steps a1), a2) and
a3) transmitting a third actuation signal on a third frequency within a third transmit time interval,
and
in that step b) comprises repeatedly alternately performing steps b1), b2) and
b3) receiving radio signals by the receiver on the third frequency used in step a3) within a third receive time interval which is longer than the third transmit time interval.

3. The method according to claim 1, wherein
step a2) comprises transmitting with higher transmission power than in step a1).

4. The method according to claim 1, wherein
b1) includes receiving radio signals by the receiver on the first frequency with a first modulation, and
b2) receiving radio signals by the receiver on the second frequency with a second modulation,
the modulation type OOK or AM is selected as the first modulation and the modulation type FSK is selected as the second modulation or as a modulation different from the first modulation.

5. The method according to claim 1, wherein
that the data content of the first and the second actuation signal is different and that the receiver determines an authorization,
5.1 if the data content of at least one of the first actuation signal and the second actuation signal indicates an authorization, or
5.2 if the data content of the first actuation signal and the data content of the second actuation signal indicates an authorization.

6. The method according to claim 5, wherein
the data content of the first and second actuation signals are linked by a predetermined algorithm in such a way that the data of one of these actuation signals has been generated by applying the algorithm to data of the other actuation signal used as original data, wherein said receiver receives said original data by receiving said other actuation signal and by inversely applying said algorithm to the data of said one actuation signal.

7. A radio remote control transmitter for use as a transmitter in the method according to claim 1, comprising a transmitter unit and a transmitter control unit, wherein the radio remote control transmitter is adapted, in response to a single actuation input for selecting the action by a user, to automatically repeatedly alternately perform the steps of:
a1) transmitting the first actuation signal at the first frequency within the first transmit time interval; and
a2) transmitting the second actuation signal on the second frequency within a second transmit time interval.

8. A radio remote control transmitter according to claim 7, wherein the radio remote control transmitter is designed to repeatedly perform a sequence of steps a1), a2) and a3) transmitting a third actuation signal on a third frequency within a third transmit time interval.

9. A radio remote control transmitter according to claim 7, wherein the radio remote control transmitter is designed to transmit on the second frequency with a higher transmission power than on the first frequency.

10. A radio remote control transmitter according to claim 7, wherein the data content of the first and the second actuation signal are different or the data content of the first and second actuating signals are linked by a predetermined algorithm in such a way that the data of one of these actuating signals are generated by applying the algorithm to data of the other actuating signal used as original data.

11. An automatic building or enclosure closure system comprising:

a transmitter, and an automatic building or enclosure closure provided with a wing movable between an open position and a closed position, an actuator for driving the movement of the wing, a receiver and a controller, wherein the transmitter, the receiver and the controller are arranged to perform the method according to claim 1.

* * * * *